Patented July 8, 1941

2,248,400

UNITED STATES PATENT OFFICE 2,248,400

STIMULATION OF FRUIT GROWTH

George S. Avery, New London, Conn.; dedicated to the free use of the Government and People of the United States No Drawing. Application January 13, 1937, Serial No. 120,449. Renewed April 15, 1938

6 Claims. (Cl. 47—58)

My invention relates to the stimulation of fruit growth and in particular fruit growths which are produced from flowering plants.

An object of my invention is to provide an easy means of applying substances which will stimulate fruit growth.

A further object of the invention is to provide falling or abscission of flower buds.

Another object of the invention is to prevent pollination subsequent to the treatment herein set forth, whereby fruit of the desired characteristics may be obtained without danger of undesirable pollination.

A further object of the invention is to obtain seedless fruits from plants which customarily produce fruit with seeds.

Yet another object is to produce seedless fruits from varieties of plants which are flowering but which are sterile.

A still further object of the invention is to produce larger fruits from plants which produce fruits with seeds, such larger fruits also having seeds.

Still another object of this invention is to accomplish the objects herein set forth by simple processes which are easy and inexpensive to conduct, and which will protect the plant so treated from fungus or insects.

In general the process comprises the treatment of growing plants with a hormone-like growth substance in a suitable carrier. The hormone-like growth substance in the carrier may be sprayed on the plants, or, under certain circumstances, painted on the buds or ovaries.

The conditions of operation, times of treatment, materials used, and other factors, depend upon the results desired.

In general, the material, which is a mixture comprising a carrier and a hormone-like substance, is sprayed all over the plants from the period beginning just before bursting of the buds to and including the period in which the flowers are open. Where the material is sprayed on the plants, the carrier is a liquid.

In the case of fancy fruits, or in any instance where it is desirable to work carefully, it is possible to paint the buds or ovaries with the mixture comprising a liquid carrier and a hormone-like substance, or, in some cases where painting is resorted to, the carrier may not necessarily be a liquid. Such nonliquid carriers may comprise stearin, lanolin, or similar materials. In the case of careful painting on of the mixture, the stigmatic surfaces are covered, and subsequent pollination is inhibited.

In general, the proportion of hormone-like growth substances to carrier is from less than 1% to 3% of the carrier.

A suitable carrier may be one which is an aqueous emulsion consisting of wax and a colloidal earth, thus forming a permeable film. The colloidal earth is made into a suspension in hot water and molten wax is added to the mixture when the latter is at a temperature which is above that of the melting point of the wax. The wax is added with constant stirring and a good emulsion is obtained. After cooling the emulsion, the auxins are added and the material is then in condition for being sprayed on the plants.

A good spray can be obtained by employing approximately 3 parts of colloidal earth, 20 parts of water, 10 parts of wax and 3 parts of the ammonia salt of a drying acid and diluting the whole with approximately 20 parts of water. A very good carrier can be formed with 6 parts by weight of paraffin wax, 4 parts by weight of beeswax, 3 parts of a colloidal earth, 3 parts of the ammonium salt of a drying acid and 10 to 15 parts of water. The term "ammonium salt of a drying acid" refers to unsaturated fatty acids having two or more double bonds in the structural formula. These fatty acids may be derived from drying oils, such as fish oil, soya bean oil, lumbang, sardine, linseed, perilla, tung and so forth. The colloidal earth may be fuller's earth or similar diatomaceous clays, but preferably bentonite.

To obtain the composition, the ammonium salt of the drying acid is dissolved in hot water; the suspension of a colloidal earth in hot water is accomplished separately; the solution and the suspension then are mixed, and to this mixture is added the molten wax at a temperature above that of the melting point of the wax. Constant stirring should take place until a good emulsion is formed, and this should continue until the mixture is cool. The hormone-like substance may then be added. Since most hormone-like substances are heat stable, it is possible, if desired, to add before the cooling.

The wax employed is preferably paraffin wax, but others can be used, such as carnauba, beeswax, and so forth.

Another example of a mixture found to be an excellent one is one employing ammonium linoleate by weight 3 parts dissolved in 50 parts of hot water. 3 parts of bentonite is made into a suspension with 50 parts of hot water. The solution and the suspension are then added together and while the mixture is above the melting point of paraffin, 10 parts of molten paraffin are poured into the mixture with vigorous stirring, and the emulsion allowed then to cool to room temperature while continuously stirring.

By applying the above described materials in ways already set forth, growth of fruit can be stimulated with or without pollination. Where pollination is not permitted, as when this special treatment is carried out before pollination can, or does occur, seedless fruits will be produced. Seedless fruits may also be produced from varieties of plants which heretofore have not borne fruits because of self-sterility, interspecific, or intervarietal sterility. Thus fruits are obtained which were heretofore absolutely unknown. Such fruits are those which can be obtained from the so-called "flowering varieties." The term "flowering varieties" is used in the horticultural sense, i. e., one to denote flowering without fruition. Fruits of this type are the so-called flowering apples, flowering cherries, flowering plums, flowering peaches, which have heretofore never produced any fruit.

Furthermore, as above indicated, seedless fruits can be produced from varieties of plants which customarily produce fruit with seeds. In this case, the stimulation (i. e., spraying, or other treatment) must take place before any possible pollination. Seedless fruit can be obtained from the following varieties of plants: tomato, raspberry, blackberry, cherry, grape, plum, and other edible fruits.

A particular advantage of this type of treatment is that many varieties are difficult to pollinate under greenhouse conditions, and this type of treatment makes it possible to get these types of fruits without pollination.

I may employ yet another type of treatment for the production of larger fruits from varieties of plants that produce fruits with seeds. Here stimulation takes place after pollination. Seeds are produced, but the fruit can be induced to grow larger than normal.

The hormone-like substances which may be employed with a carrier are auxins $a$ and $b$, hetero-auxin, and other naturally occurring plant hormones. Also, there may be employed indole derivatives such as, indole-3-propionic acid, indole-butyric acid, indole-acetic acid, as well as salts of these acids. Naphthalene derivatives may be employed as hormone-like substances, such as alpha and beta naphthalene acetic acid. Other substances which may be employed are phenyl acetic acid, fluorene acetic acid, and anthracene acetic acid. These substances may be used above with a carrier, or in various combinations of two or more hormone-like substances.

The hormone-like substance may be put on the plant in combination with an insecticide or a fungicide. In fact, both combinations of hormone-like material, insecticide and fungicide may be employed. Where a water mixture of insecticide or fungicide is employed, often no special carrier is necessary. Often, however, it is desirable to have an insecticide and a fungicide in a special carrier with a hormone-like substance. The carrier given in this specification has been found to be an excellent one for such a purpose. When the material is sprayed on the plant, insecticides such as arsenate of lead in water solution, Paris green in water solution, or nicotine sulphate in water solution may be employed. These insecticides may be used either alone, or mixed, and in combination with a hormone-like material.

In addition to the insecticide added to the hormone-like material, a fungicidal spray material may be employed, such as colloidal sulphur, Bordeaux mixture, and lime sulphur mixture. Often the fungicide, the insecticide, and the hormone-like substance may be incorporated in one mixture.

While showing several modifications of my invention herein, it is to be understood that I am to be limited only by the showing of the prior art and the scope of the appended claims.

I claim:

1. A method of treating flowering varieties of plants after pollination to increase the size of the fruits comprising the step of placing a hormone-like substance on a blossom of the plant.

2. A method of treating flowering varieties of plants after pollination to increase the size of the fruits comprising the step of placing an isolated hormone-like substance on a blossom of the plant.

3. A method of producing fruits comprising placing on a blossom a hormone-like substance, selected from the group: Auxin A and B, hetero-auxin, plant stimulants containing the indole or naphthalene ring and their derivatives, phenyl acetic acid, fluorene acetic acid, and anthracene acetic acid.

4. A method of producing fruits parthenocarpically comprising placing on a blossom a hormone-like substance, selected from the group: Auxin A and B, hetero-auxin, plant stimulants containing the indole or naphthalene ring and their derivatives, phenyl acetic acid, fluorene acetic acid, and anthracene acetic acid.

5. A method of treating flowering varieties of plants after pollination to increase the size of the fruit comprising placing on a blossom a hormone-like substance, selected from the group: Auxin A and B, hetero-auxin, plant stimulants containing the indole or naphthalene ring and their derivatives, phenyl acetic acid, fluorene acetic acid, and anthracene acetic acid.

6. A method of increasing the size of fruits comprising spraying a hormone-like substance on a blossom of the growing plant after pollination.

GEORGE S. AVERY.